(12) United States Patent
Uehara

(10) Patent No.: US 10,191,192 B2
(45) Date of Patent: Jan. 29, 2019

(54) LIGHT AMOUNT ADJUSTING DEVICE, LENS BARREL, AND IMAGE CAPTURING APPARATUS

(71) Applicant: CANON KABUSHIKI KAISHA, Tokyo (JP)

(72) Inventor: Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/059,092

(22) Filed: Mar. 2, 2016

(65) Prior Publication Data

US 2016/0259100 A1    Sep. 8, 2016

(30) Foreign Application Priority Data

Mar. 5, 2015 (JP) ................................ 2015-044030

(51) Int. Cl.
  *G02B 5/20* (2006.01)
  *G02B 7/00* (2006.01)

(52) U.S. Cl.
  CPC ............ *G02B 5/205* (2013.01); *G02B 7/006* (2013.01)

(58) Field of Classification Search
  CPC ........... G02B 5/205; G02B 7/006; G03B 7/18
  USPC ........................................................ 396/510
  See application file for complete search history.

(56) References Cited

U.S. PATENT DOCUMENTS

| 8,731,393 B2* | 5/2014 | Nakamura | G03B 7/18 352/212 |
| 2007/0248349 A1* | 10/2007 | Nanjo | G02B 26/02 396/241 |
| 2011/0293258 A1* | 12/2011 | Nakamura | G03B 7/18 396/235 |

FOREIGN PATENT DOCUMENTS

| CN | 1542533 A | 11/2004 |
| CN | 103327885 A | 9/2013 |
| CN | 103765310 A | 4/2014 |
| CN | 103988098 A | 8/2014 |
| JP | 2007292828 A | 11/2007 |
| JP | 2011-248029 A | 12/2011 |

* cited by examiner

*Primary Examiner* — Noam Reisner
(74) *Attorney, Agent, or Firm* — Canon U.S.A., Inc. IP Division

(57) ABSTRACT

A light amount adjusting device includes ND filters rotating around shafts serving as rotation shafts and moving between in-use positions and retracted positions, arranged on a base plate. The respective ND filters include uniform density portions, gradation portions, and transparent portions. If the ND filters are in the retracted positions, the transparent portions of the respective ND filters overlap in an area facing an aperture to cover the entire aperture with the transparent portions. If the ND filters are in the in-use positions, the gradation portions of the respective ND filters overlap in an area facing the aperture to cover the entire aperture with the gradation portions and the uniform density portions. Moreover, a combined density acquired when the gradation portions overlap in just proportion is substantially the same as an optical density of each of the uniform density portions.

7 Claims, 10 Drawing Sheets

LIGHT AMOUNT ADJUSTING DEVICE, LENS BARREL, AND IMAGE CAPTURING APPARATUS

BACKGROUND OF THE INVENTION

Field of the Invention

The present invention relates to a light amount adjusting device, a lens barrel, and an image capturing apparatus, and more particularly, to those suitable for adjustment of an incoming light amount.

Description of the Related Art

A camera including a neutral density (ND) filter inside a lens barrel is known as one example of an optical apparatus including a light amount adjusting device for acquiring an appropriate exposure amount.

The light amount adjusting device inside the lens barrel is often disposed near a diaphragm. The light amount adjusting device includes an ND filter formed in size for covering the entire diameter of an aperture through which light flux passes. A general ND filter is movably supported between a position in which the ND filter completely covers the aperture and a position in which the ND filter is completely retracted from the aperture. Accordingly, a general light amount adjusting device has an outer diameter that needs to be at least three times as large as the diameter of the aperture in consideration of space in which the retracted ND filter is stored.

Moreover, a light amount adjusting device including a plurality of ND filters is known. An optical apparatus discussed in each of Japanese Patent Application Laid-Open No. 2007-292828 and Japanese Patent Application Laid-Open No. 2011-248029 includes two ND filters. Each of the two ND filters includes a transparent portion having a uniform transmittance and a gradation portion having a transmittance that continuously changes. When an image of a high-brightness subject is captured, the two ND filters are arranged to cover the aperture. This attenuates the light to acquire an appropriate light amount. Here, an amount of the gradation portion to be inserted into the aperture changes depending on a position of each of the ND filters, and a combined density acquired by overlaying the two filters changes. Consequently, adjustment of a position of each of the ND filters enables a light amount to be adjusted in a non-stepwise manner.

Although cameras of recent years are expected to be compact, installation of a large image capturing element and an optical element with a small F number (i.e., an optical system having a large aperture diameter) is demanded. That is, the camera is demanded that a lens barrel is smaller and an aperture diameter covered with an ND filter is larger.

However, a light amount adjusting device including a single ND filter has an outer diameter which needs to be at least three times as large as the aperture diameter, as described above. Thus, an increase in the aperture diameter increases size of the light amount adjusting device. This causes difficulty in reducing size of the camera.

Since the light amount adjusting device discussed in Japanese Patent Application Laid-Open No. 2007-292828 can adjust a combined density of the two ND filters in a non-stepwise manner, a width of the gradation portion is greater. This increase size of the light amount adjusting device.

In the light amount adjusting device discussed in Japanese Patent Application Laid-Open No. 2011-248029, each of the two ND filters includes the transparent portion. At the time of retraction, the ND filter including the transparent portion needs to be retracted from the aperture. This increases space for storing the retracted ND filter. Consequently, size of the light amount adjusting device is increased.

SUMMARY OF THE INVENTION

The present invention is directed to reduction in size of a light amount adjusting apparatus.

According to an aspect of the present invention, a light amount adjusting device for adjusting an amount of light passing through an aperture includes a first filter, including a transparent area and a non-transparent area, configured to move between a retracted position and an in-use position in an area including an area facing the aperture, and a second filter, including a transparent area and a non-transparent area, configured to move between a retracted position and an in-use position in an area including the area facing the aperture, wherein, if the first filter and the second filter are in the retracted positions, the transparent area of the first filter and the transparent area of the second filter overlap in a position facing an entire area of the aperture, and wherein, if the first filter and the second filter are in the in-use positions, the transparent area of the first filter and the non-transparent area of the second filter overlap in a position facing the aperture, and the non-transparent area of the first filter and the transparent area of the second filter overlap in a position facing the aperture.

Further features of the present invention will become apparent from the following description of exemplary embodiments with reference to the attached drawings.

DESCRIPTION OF THE EMBODIMENTS

Exemplary embodiments of the present invention are hereinafter described with reference to the drawings.

A first exemplary embodiment of the present invention is described.

First, an image capturing apparatus as an example in which a light amount adjusting device is applied is described.

Figure 1:
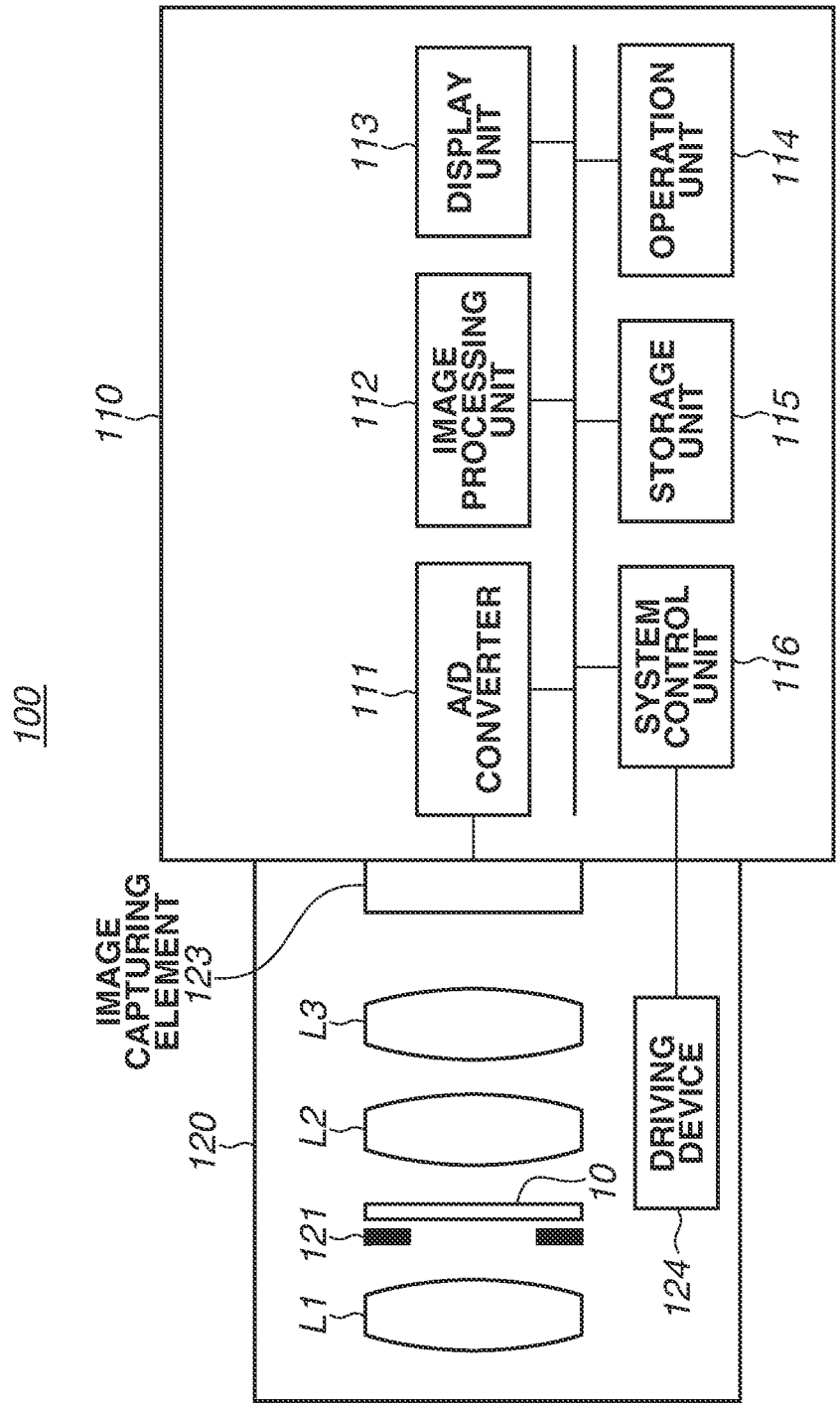
FIG. 1 is a diagram illustrating one example of an image capturing apparatus.

FIG. 1 is a schematic diagram illustrating one example of an image capturing apparatus 100.

In FIG. 1, the image capturing apparatus 100 includes a camera body 110 and a lens barrel 120. The lens barrel 120 can be attached to the camera body 110 or integrated with the camera body 110. That is, a light amount adjusting device 10 can be arranged in the lens barrel 120 which is independent of the camera body 110, or in the image capturing apparatus 100 integrated with the lens barrel 120. The light amount adjusting device 10 may be arranged in an optical apparatus other than the image capturing apparatus.

The lens barrel 120 includes an image capturing lens optical system including a first lens group L1, a second lens group 12, a third lens group L3, a diaphragm 121, and the light amount adjusting device 10. In the present exemplary embodiment, moreover, an image capturing element 123 is attached to the lens barrel 120.

Moreover, the lens barrel 120 includes a driving device 124 that drives each unit of the lens barrel 120. The driving device 124 separately controls operations of the first lens group L1, the second lens group L2, the third lens group L3, the diaphragm 121, and the light amount adjusting device 10.

The camera body 110 includes an analog digital (A/D) converter 111, an image processing unit 112, a display unit 113, an operation unit 114, a storage unit 115, and a system control unit 116.

An image of a subject is formed by the image capturing element 123 via the image capturing lens optical system. The image capturing element 123 converts the formed image of the subject (light signals) into analog electric signals. The A/D converter 111 converts the analog electric signals output from the image capturing element 123 into digital electric signals (image signals). The image processing unit 112 performs various image processing on the digital electric signals (the image signals) output from the A/D converter 111.

The display unit 113 displays various information using, for example, an electric viewfinder and a liquid crystal panel. The operation unit. 114 has a function as a user interface that is used by a user to issue an instruction to the image capturing apparatus 100. The display unit 113 may include a touch panel. In such a case, the touch panel serves as a part of the operation unit 114.

The storage unit 115 stores various data such as image data which has undergone image processing performed by the image processing unit 112. Moreover, the storage unit 115 stores a program. The storage unit 115, for example, uses a read only memory (ROM), a random access memory (RAM), and a hard disk drive (HDD) to store the various data and the program.

The system control unit 116 comprehensively controls the image capturing apparatus 100 by using, for example, a central processing unit (CPU).

Figure 2:
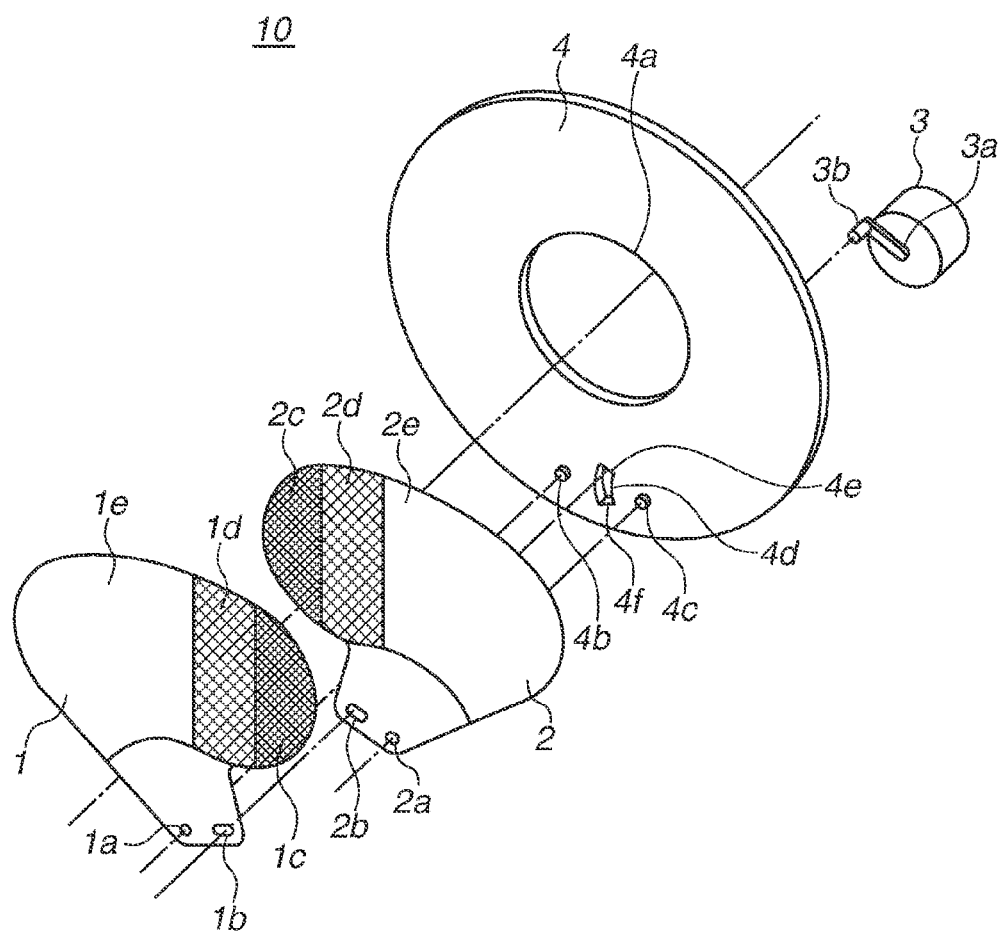
FIG. 2 is an exploded perspective view of a light amount adjusting device.

FIG. 2 is an exploded perspective view of the light amount adjusting device 10.

The light amount adjusting device 10 includes an ND filter 1, an ND filter 2, an actuator 3, and a base plate 4.

The ND filter 1 serves as a light attenuation filter. The ND filter 1 is one example of a first filter, and includes a hole 1a that engages a shaft 4b of the base plate 4, and an elongated hole 1b to which a driving pin 3b of the actuator 3 is inserted. The ND filter 1 includes a vapor-deposited film for attenuation of light. With the vapor-deposited films, a uniform density portion 1c, a gradation portion 1d, and a transparent portion 1e of three portions are formed in the ND filter 1. The uniform density portion 1c serves as one example of a uniform density area, the gradation portion 1d serves as one example of a gradation area, and the transparent portion 1e serves as one example of a transparent area. In the uniform density portion 1c, a vapor-deposited film (which is opaque or translucent) is formed on a base material of the ND filter 1 such that an optical density is uniform. In the gradation portion 1d, a gradation-like vapor-deposited film is formed on the base material of the ND filter 1 such that an optical density is gradually lowered from a position in which the gradation portion 1d contacts the uniform density portion 1c toward a position in which the gradation portion 1d contacts the transparent portion 1e. The transparent portion 1e has a uniform transparency. The base material of the ND filter 1 is transparent. Thus, a vapor-deposited film is not formed on the transparent portion 1e. However, a transparent vapor-deposited film may be formed on the base material to form the transparent portion 1e.

Similar to the ND filter 1, the ND filter 2 serves as a light attenuation filter. The ND filter 2 is one example of a second filter. The ND filter 2 includes a hole 2a that engages a shaft 4c of the base plate 4, and an elongated hole 2b to which the driving pin 3b of the actuator 3 is inserted. With vapor-deposited films on the ND filter 2, three portions that are a uniform density portion 2c, a gradation portion 2d, and a transparent portion 2e are formed as similar to the ND filter 1. The uniform density portion 2c serves as one example of a uniform density area, the gradation portion 2d serves as one example a gradation area, and the transparent portion 2e serves as one example of a transparent area. In the uniform density portion 2c, a vapor-deposited film (which is opaque or translucent) is formed on a base material of the ND filter 2 such that an optical density is uniform. In the gradation portion 2d, a gradation-like vapor-deposited film is formed on the base material of the ND filter 2 such that an optical density is gradually lowered from a position in which the gradation portion 2d contacts the uniform density portion 2c toward a position in which the gradation portion 2d contacts the transparent portion 2e. The transparent portion 2e has a uniform transparency. Similar to the base material of the ND filter 1, the base material of the ND filter 2 is transparent. Thus, a vapor-deposited film is not formed in the transparent portion 2e. However, a transparent vapor-deposited film may be formed on the base material to form the transparent portion 2e.

The ND filters 1 and 2 are attached to the base plate 4. The ND filters 1 and 2 are supported by a cover member (not illustrated) so as not fail from the base plate 4.

The actuator 3 is attached to a surface of the base plate 4 with a screw (not illustrated), the surface being arranged at a side opposite to a surface on which the ND filters 1 and 2 are arranged, among surfaces of the base plate 4.

Among surfaces of the actuator 3, a driving lever 3a is rotatably supported on a surface facing the base plate 4 (i.e., the surface on the side on which the ND filters 1 and 2 are arranged). On a tip of the driving lever 3a, a driving pin 3b serving as one example of a rod member projects toward the ND filters 1 and 2. The driving pin 3b is inserted into a through hole 4d of the base plate 4, the elongated hole 1b of the ND filter 1, and the elongated hole 2b of the ND filter 2.

The base plate 4 includes an aperture 4a through which light flux passes, the shaft 4b for supporting the ND filter 1, the shaft 4c for supporting the ND filter 2, and the through hole 4d in which the driving pin 3n of the actuator 3 is inserted.

The driving pin 3b of the actuator 3 moves between an ND in-use position and an ND retracted position. The ND in-use position represents a position of the driving pin 3b when the vapor-deposited films of the ND filters 1 and 2 are arranged in an area facing the aperture 4a to attenuate light. The ND retracted position represents a position of the driving pin 3b when the vapor-deposited films of the ND filters 1 and 2 are retracted from the aperture 4a. The driving device 124 controls the movement of the driving pin 3b of the actuator 3.

With the movement of the driving pin 3b of the actuator 3, the ND filters 1 and 2 are respectively rotated around the shafts 4b and 4c serving as rotation shafts.

When an amount of light passing through the aperture 4a is reduced by the ND filters 1 and 2 (i.e., when the ND filters 1 and 2 are used), the driving pin 3b contacts a contact surface 4e, at the time when the vapor-deposited film is in use, of the through hole 4d of the base plate 4. When the ND filters 1 and 2 are retracted, the driving pin 3b contacts a contact surface 4f, at the time when the vapor-deposited film is retracted, of the through hole 4d of the base plate 4. Each of the ND filters 1 and 2 moves between an in-use position in which the vapor-deposited film covers the aperture 4a and a retraction position in which the vapor-deposited film is retracted from the aperture 4a according to a position of the driving pin 3b.

Figure 3:
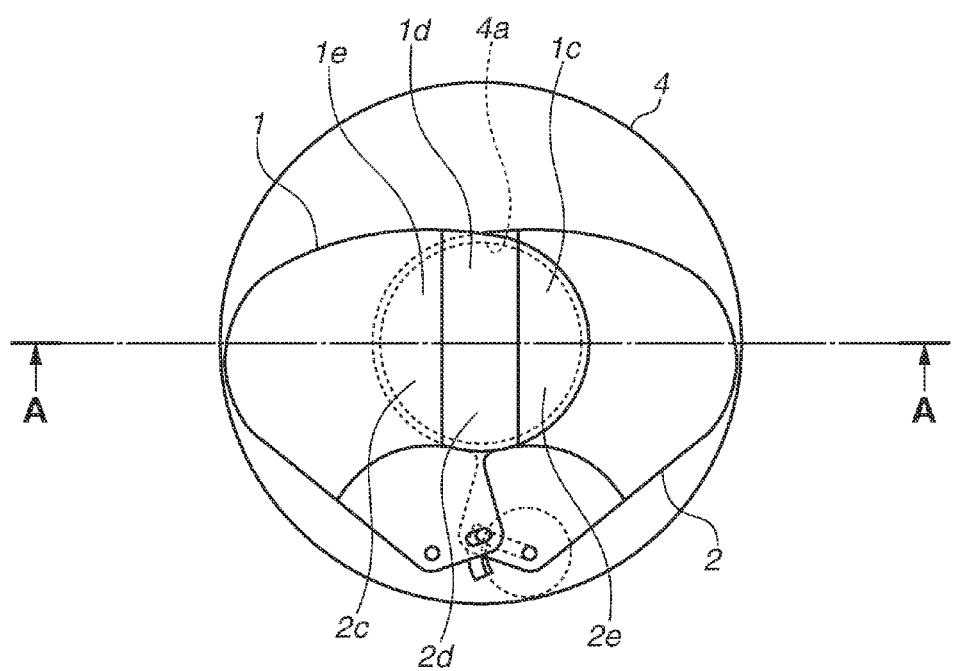
FIG. 3 is a diagram illustrating a first example of a positional relation of neutral density (ND) filters.
Figure 4:
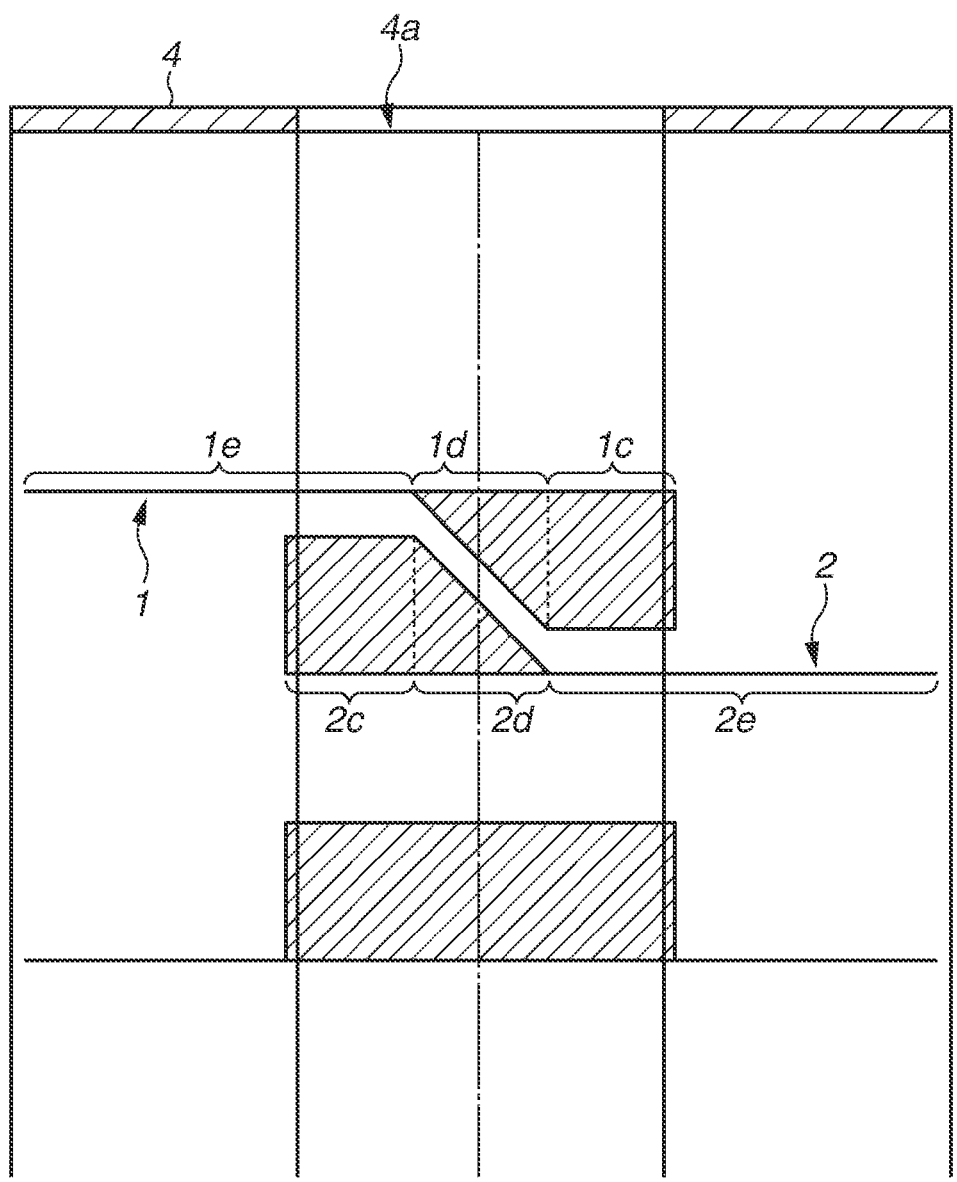
FIG. 4 is a diagram illustrating a first example of optical densities of the ND filters.

FIG. 3 is a diagram illustrating one example of a positional relation of the ND filters 1 and 2 when the driving pin. 3b is in the ND in-use position. In FIG. 3, the ND filter 1, the ND filter 2, and the base plate 4 are illustrated in a front view, so that the positional relation of the ND filters 1 and 2 is shown. FIG. 4 is a diagram illustrating one example of optical densities of the ND filters 1 and 2 when the driving pin 3b is in the ND in-use position. In FIG. 4, each position in a horizontal direction represents each position along the line A-A of FIG. 3. An upper portion of the diagram illustrated in FIG. 4 is a sectional view of the base plate 4 along the line A-A of FIG. 3. In a middle portion of the diagram illustrated in FIG. 4, optical density distributions of the ND filters 1 and 2 are separately illustrated with hatching in a direction of the line A-A shown in FIG. 3. In a lower portion of the diagram illustrated in FIG. 4, a distribution acquired by combining the optical density distributions of the ND filters 1 and 2 in the middle portion of FIG. 4 is illustrated with hatching. In FIG. 4, the greater the height of the hatching area, the higher the optical density of the ND filter 1. The greater the height of the hatching area, the higher the optical density of the ND filter 2.

As illustrated in FIGS. 3 and 4, when the driving pin 3b is in the ND in-use position (i.e., when the light which passes through the aperture 4a is attenuated by the ND filters 1 and 2), the uniform density portion 1c of the ND filter 1 and the transparent portion 2e of the ND filter 2 overlap in an area facing the aperture 4a. Moreover, the gradation portion 1d of the ND filter 1 and the gradation portion 2d of the ND filter 2 overlap in the area facing the aperture 4a. Moreover, the transparent portion 1e of the ND filter 1 and the uniform density portion 2c of the ND filter 2 overlap in the area facing the aperture 4a.

Here, optical density of the uniform density portion 1c is substantially the same as that of the uniform density portion 2c. The gradation portions 1d and 2d may overlap with each other in just proportion. In such a case, in the overlapping area, optical density distributions of the gradation portions 1d and 2d are defined such that a combined density of the two ND filters 1 and 2 is substantially the same as an optical density of each of the uniform density portions 1c and 2c.

Figure 5:
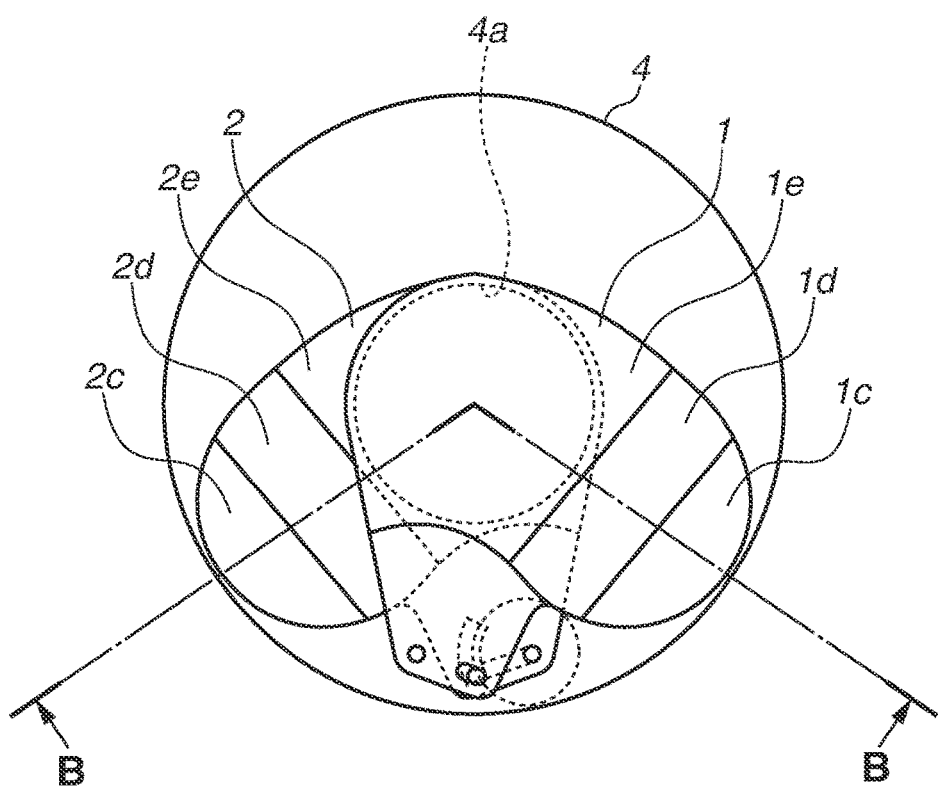
FIG. 5 is a diagram illustrating a second example of a positional relation of the ND filters.
Figure 6:
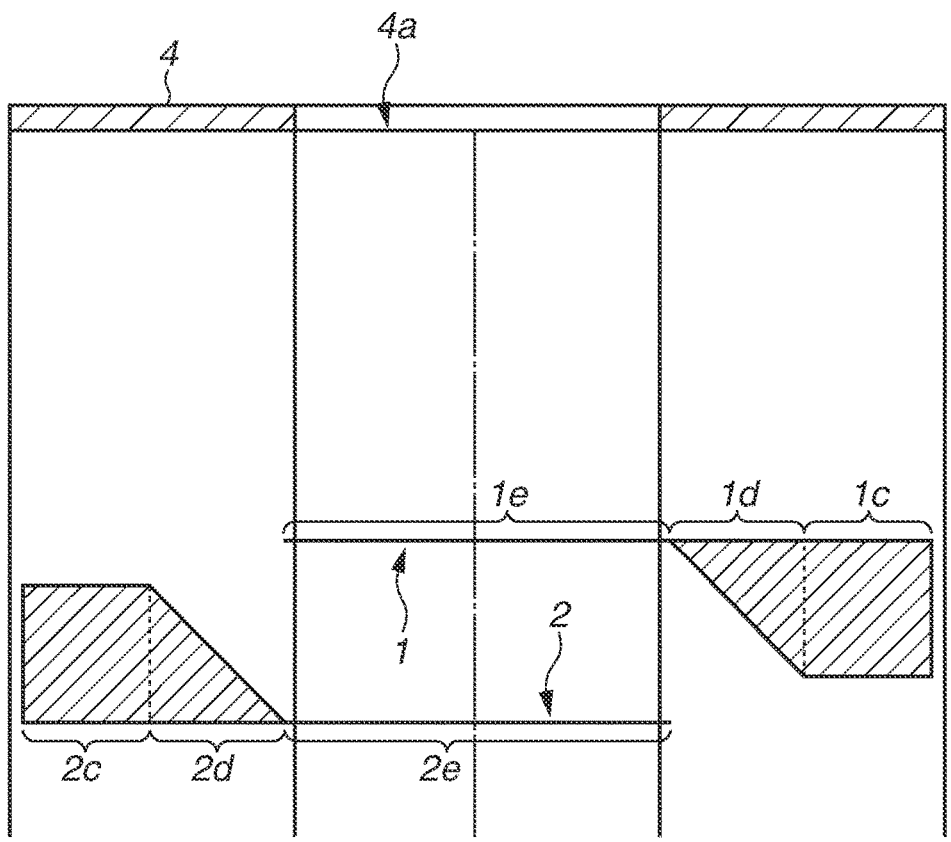
FIG. 6 is a diagram illustrating a second example of optical densities of the ND filters.

FIG. 5 is a diagram illustrating one example of a positional relation of the ND filters 1 and 2 when the driving pin 3b is in the ND retracted position in FIG. 5, as similar to the diagram illustrated in FIG. 3, the ND filter 1, the ND filter 2, and the base plate 4 are illustrated in a front view, so that the positional relation of the ND filters 1 and 2 is shown. FIG. 6 is a diagram illustrating optical densities of the ND filters 1 and 2 when the driving pin 3b is in the ND retracted position. In FIG. 6, each position in a horizontal direction represents each position along the line B-B of FIG. 5. An upper portion of the diagram illustrated in FIG. 6 is a sectional view of the base plate 4 along the line B B of FIG. 5. A lower portion of the diagram illustrated in FIG. 6 separately illustrates optical density distributions of the ND filters 1 and 2 with hatching in a direction of the line BB shown in FIG. 5. In FIG. 6, as similar to the diagram illustrated in FIG. 4, the greater the height of the hatching area, the higher the optical density of the ND filter 1. The greater the height of the hatching area, the higher the optical density of the ND filter 2.

As illustrated in FIGS. 5 and 6, with regard to the ND filters 1 and 2 when the driving pin 3b is in the ND retracted position, the aperture 4a is covered with only the transparent portions 1e and 2e of the respective ND filters 1 and 2 such that the gradation portions 1d and 2d and the uniform density portions 1c and 2c are not positioned in an area facing the aperture 4a. Accordingly, when the light which passes through the aperture 4a is not attenuated by the ND filters 1 and 2, only the transparent portions 1e and 2e are arranged facing the aperture 4a, out of the uniform density portions 1c and 2c, the gradation portions 1d and 2d, and the transparent portions 1e and 2e or the respective ND filters 1 and 2.

Moreover, in the present exemplary embodiment, when the driving pin 3b is in the ND retraction position, the transparent portions 1e and 2e of the respective ND filters 1 and 2 completely cover the aperture 4a. Assume that size of each of the transparent portions 1e and 2e of the ND filters 1 and 2 is smaller than that to completely cover the aperture 4a. In such a case, an end of a base material (e.g., a polyethylene terephthalate (PET) sheet) of each of the ND filters 1 and 2 is exposed to light. This may cause generation of ghost in an image. Moreover, a range in which the ND filters 1 and 2 are present and a range in which the ND filters 1 and 2 are absent may be generated within the aperture 4a. Hence, an optical path length difference may be generated by refractive index and thickness of the base material of each of the ND filters 1 and 2 depending on an optical path. In this case, image quality may be affected by, for example, degradation in a modulation transfer function (MTF).

In the present exemplary embodiment, on the other hand, two base materials are always arranged inside the aperture 4a regardless of whether the ND filters 1 and 2 are used (at the image capturing) or retracted. Accordingly, image quality cannot be degraded due to an optical path length difference or light reflected by the ends of the base materials of the ND filters 1 and 2.

As illustrated in FIGS. 5 and 6, when the ND filters 1 and 2 are retracted, the gradation portions 1d and 2d are retracted to respective areas just outside the aperture 4a. Thus, a movement distance (a minimum movement amount) between the ND filter 1 at the time of use and the ND filter 1 at the time of retraction is obtained by adding a width of the uniform density portion 1c to a width of the gradation portion 1d as illustrated in FIG. 6. Similarly, a movement distance (a minimum movement amount) between the ND filter 2 at the time of use and the ND filter 2 at the time of retraction is obtained by adding a width of the uniform density portion 2c to a width of the gradation portion 2d as illustrated in FIG. 6. That is, a movement distance (a minimum movement amount) between the ND filter 1 at the time of use and the ND filter 1 at the time of retraction is smaller than a diameter of the aperture 4a, and a movement distance (a minimum movement amount) between the ND filter 2 at the time of use and the ND filter 2 at the time of retraction is smaller than the diameter of the aperture 4a. Therefore, retraction space for the light amount adjusting device 10 according to the present exemplary embodiment is smaller than that for a related-art light amount adjusting device with a single ND filter. This can reduce an outside diameter of the light amount adjusting device 10 as a whole. Moreover, an outside diameter of the light amount adjusting device 10 as a whole can be smaller than that acquired by the technique discussed in Patent Document 1 in which a width of a gradation portion is greater to adjust an optical density in a non-stepwise manner by combining optical densities of two ND filters. Moreover, an outside diameter of the light amount adjusting device 10 as a whole can be smaller than that acquired by the technique discussed in Patent Document 2 in which areas including a transparent area are retracted from an aperture.

When the ND filters 1 and 2 are used, an error in a position of the ND filter 1 and/or the ND filter 2 may occur. Such an error is caused by a predominant parameter of a lever ratio $\alpha$. The lever ratio $\alpha$ represents a ratio of a distance from the hole 1a of the ND filter 1 (i.e., the shaft 4b) to a stopper that determines a stop position of the ND filter 1 at the time of use to a distance from the hole 1a of the ND filter 1 (i.e., the shaft 4b) to an optical axis center. Similarly, the lever ratio $\alpha$ represents a ratio of a distance from the hole 2a of the ND filter 2 (i.e., the shaft 4c) to the stopper that determines a stop position of the ND filter 2 at the time of use to a distance from the hole 2a of the ND filter 2 (i.e., the shaft 4c) to the optical axis center.

In the present exemplary embodiment, a function of the stopper for determining the stop positions of the ND filters 1 and 2 at the time of use is realized by the contact surface 4e that contacts the driving pin 3b. Assume that a distance from the shaft 4b to the contact surface 4e is 3 [mm], and a distance from the shaft 4b to the optical axis center is 15 [mm]. In such a case, a lever ratio $\alpha$ is 5 (=15÷3). Here, if a position of the contact surface 4e is shifted by 0.1 [mm] in a movement direction of the driving pin 3b with respect to the positions of the shafts 4b and 4c, the stop positions of the ND filters 1 and 2 at the time of use with respect to the optical axis center are increased by the lever ratio $\alpha$. Hence, the stop positions are shifted by 0.5 (=5×0.1) [mm].

In a case where an error in the stop position of the ND filter 1 and/or the ND filter 2 at the time of use occurs, an overlapping amount of the gradation portions 1d and 2d changes. This changes the combined density of the ND filters 1 and 2. For example, the ND filters 1 and 2 may excessively move compared to a case were such an error is absent. In such a case, the combined density of the ND filters 1 and 2 increases.

Figure 7:
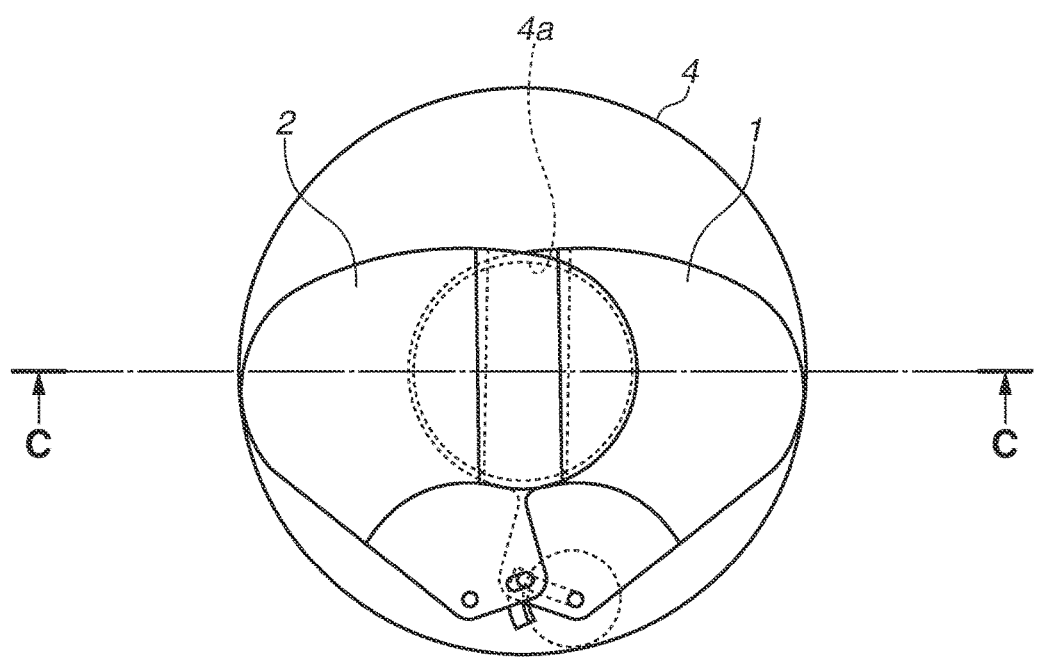
FIG. 7 is a diagram illustrating a third example of a positional relation of the ND filters.
Figure 8:
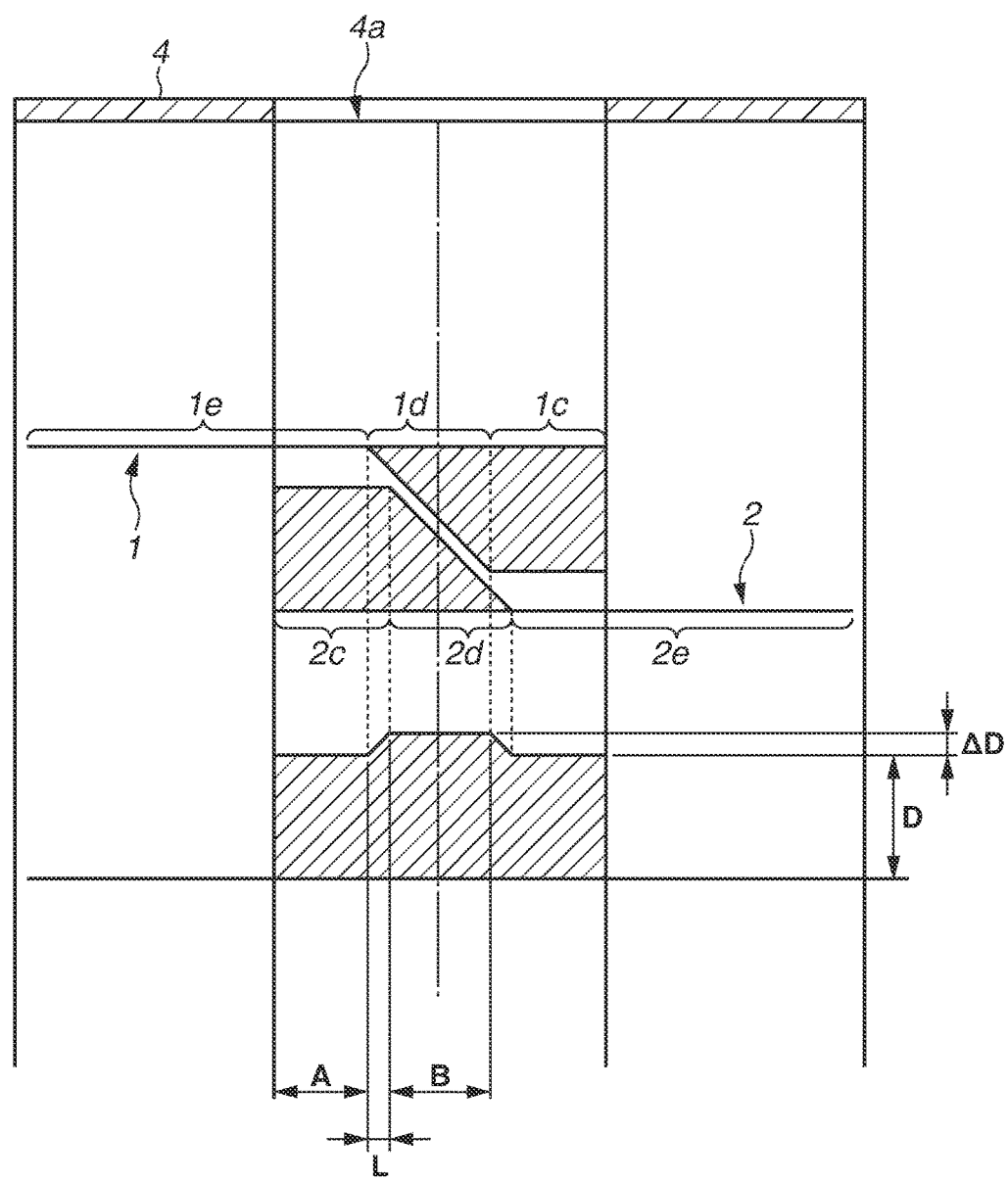
FIG. 8 is a diagram illustrating a third example of optical densities of the ND filters.

FIG. 7 is a diagram illustrating a positional relation of the ND filters 1 and 2 when the driving pin 3b is in the ND in-use position and the ND filters 1 and 2 are excessively moved by an amount of errors in the stop positions. In FIG. 7, as similar to the diagram illustrated in FIG. 3, the ND filter 1, the ND filter 2, and the base plate 4 are illustrated in a front view, so that the positional relation of the ND filters 1 and 2 is shown. FIG. 8 is a diagram illustrating optical densities of the ND filters 1 and 2 when the driving pin 3b is in the ND in-use position, and the ND filters 1 and 2 are excessively moved by an amount of the errors in the stop positions. In FIG. 8, each position in a horizontal direction represents each position along the line C-C of FIG. 7. An upper portion of the diagram illustrated in FIG. 8 is a sectional view of the base plate 4 along the line C-C of FIG. 7. In a middle portion of the diagram illustrated in FIG. 8, optical density distributions of the ND filters 1 and 2 are separately illustrated with hatching in a line C-C direction shown in FIG. 7. In a lower portion of FIG. 8, a combined distribution of the optical density distributions of the ND filters 1 and 2 illustrated in the middle portion of FIG. 8 is illustrated with hatching. In FIG. 8, as similar to the diagram illustrated in FIG. 4, the greater the height of the hatching area, the higher the optical density of the ND filter 1. The greater the height of the hatching area, the higher the optical density of the ND filter 2.

As illustrated in FIGS. 7 and 8, a combined density of the gradation portions 1d and 2d is increased by only the amount by which the ND filters 1 and 2 have excessively moved. However, an optical density of the ND filter 1 continuously increases from a position that contacts the transparent portion 1e toward a position that contacts the uniform density portion 1c, and an optical density of the ND filter 2 continuously increases from a position that contacts the transparent portion 2e toward a position that contacts the uniform density portion 2c. Accordingly, the combined density of the gradation portions 1d and 2d is prevented from being discontinuously changed between an area A in which the uniform density portion 2c overlaps the transparent portion 1e and an area B in which the gradation portion 1d overlaps the gradation portion 2d (see the lower portion of FIG. 8). This can prevent image quality degradation, for example, unnatural shading of a blurred image can be less likely to be noticed, even if errors in the stop positions of the two ND filters 1 and 2 occur.

Next, descriptions of one example of a setting method of a density change rate [/mm] and one example of a setting method of a width of each of the gradation portions 1d and 2d are given. The density change rate is an amount of changes in optical density per unit distance (herein, 1 [mm]) in each of the gradation portions 1d and 2d.

As described above, the gradation portion 1d of the ND filter 1 is arranged between the transparent portions 1e and the uniform density portion 1c, whereas the gradation portion 2d of the ND filter 2 is arranged between the transparent portion 2e and the uniform density portion 2c. Such arrangement can prevent a sudden change in a combined density of the ND filters 1 and 2 even if errors in stop positions of the ND filters 1 and 2 occur. As the gradation portions 1d and 2d become wider, a change in the combined density in an area in which the gradation portions 1d and 2d overlap becomes smaller. On the other hand, an excessive width of the gradation portions 1d and 2d causes difficulty in reducing size of the light amount adjusting device 10.

If a position error of the stopper for determining a stop position of each of the ND filters 1 and 2 is $\delta$ and a lever ratio is $\alpha$, an error in distance from the optical axis center to a stop position of each of the ND filters 1 and 2 is expressed as $\delta \times \alpha$. The position error used here is in a movement direction of the driving pin 1b. According to the present exemplary embodiment described above, a function of the stopper for determining the stop positions of the ND filters 1 and 2 at the time of use is realized by the contact surface 4e which contacts the driving pin 1b.

If each of the ND filters 1 and 2 has a stop position error of $\delta \times \alpha$, the two stop position errors are added. Hence, a distance L between the area A and the area B illustrated in FIG. 8 is expressed by Expression 1.

$$L = \delta \times \alpha \times 2 \qquad \text{Expression 1:}$$

Moreover, assume that a density change rate that is an amount of changes in density per unit distance of each of the gradation portions 1d and 2d is d. Assume that a difference between an optical density D in the area A and an optical density D in the area B involving the stop position error is ΔD. The uniform density portion 2c overlaps the transparent portion 1e in the area A, whereas the gradation portion 1d overlaps the gradation portion 2d in the area B. In such a case, Expression 2 is established.

$$\Delta D = L \times d \quad \text{Expression 2:}$$

The optical density D is a value that satisfies $10^{-D}$=transmittance. In the following description, as may be necessary, the ΔD is referred to as an amount of changes in the combined density due to an error in a stop position of each of the ND filters 1 and 2.

Here, if the ΔD, which is an amount of changes in the combined density due to the error in the stop position of each of the ND filters 1 and 2, is approximately two-level (corresponding to an optical density of 0.6), image quality is affected, for example, shading of a blurred image becomes noticeable. That is, a condition of Expression 3 needs to be satisfied in consideration of image quality.

$$\Delta D < 0.6 \quad \text{Expression 3:}$$

On the other hand, if a density change rate d of each of the gradation portions 1d and 2d of the ND filters 1 and 2 is excessively low, an influence on the image quality is reduced. However, a width of the gradation portions 1d and/or 2d increases. This causes difficulty in reducing size of the light amount adjusting device 10. The density change rate d of each of the gradation portions 1d and 2d of the ND filters 1 and 2 has a lower limit defined by a value that can adequately reduce an influence on the image quality due to the error in the stop position of each of the ND filters 1 and 2 at the time of use.

If the ΔD, which is an amount of changes in the combined density due to the error in the stop position of each of the ND filters 1 and 2, is approximately one third level (corresponding to an optical density of 0.1), shading of a blurred image is almost unnoticeable. Accordingly, a condition of Expression 4 needs to be satisfied to achieve reduction in size of the light amount adjusting device 10 and reduction of influence on the image quality.

$$0.1 < \Delta D < 0.6 \quad \text{Expression 4:}$$

Accordingly, Expression 5 is obtained based on Expressions 1, 2, and 4.

$$0.1 < \delta \times \alpha \times 2 \times d < 0.6 \quad \text{Expression 5:}$$

Here, if a position error δ of the stopper for determining a stop position of each of the ND filters 1 and 2 at the time of use is 0.1 [mm] (δ=0.1) in a movement direction of the driving pin 3b, Expression 6 is obtained based on Expression 5.

$$0.5/\alpha < d < 3/\alpha \quad \text{Expression 6:}$$

If the position error δ of the stopper for determining a stop position of each of the ND filters 1 and 2 at the time of use is 0.1 [mm] in the movement direction of the driving pin 3b, a density change rate d of each of the gradation portions 1d and 2d of the ND filters 1 and 2 is set in a range that satisfies Expression 6. This can achieve not only reduction in size of the light amount adjusting device 10, but also reduction of influence on the image quality.

For example, assume that an optical density D of each of the uniform density portions 1c and 2c is 0.9 (three-level, a transmittance of 12.5%). As described above, if a distance from the shaft 1b to the contact surface 4e is 3 [mm] and a distance from the shaft 4b to the optical axis center is 15 [mm], a lever ratio α is 5.

As for image quality, an optical density D is preferably held at 0.6 (two-level) or less as ΔD, which is an amount of changes in the combined density due to the error in the stop position of each of the ND filters 1 and 2. Moreover, the ΔD, which is an amount of changes in the combined density due to the error in the stop position of each of the ND filters 1 and 2, can be 0.1 (one third level) in an optical density in consideration of reduction in size of the light amount adjusting device 10. As long as the ΔD is 0.1 in the optical density, adequate image quality can be maintained and size of the light amount adjusting device 10 can be reduced.

Accordingly, if a position error δ of the stopper for determining a stop position of each of the ND filters 1 and 2 at the time of use is 0.1 [mm] (δ=0.1) in a movement direction of the driving pin 3b, a density charge rate d of each of the gradation portions 1d and 2d of the ND filters 1 and 2 is set in a range expressed by Expression 7. This can reduce nor only size of the light amount adjusting device 10 but also influences on image quality.

$$0.1 < d < 0.6 \quad \text{Expression 7:}$$

Each of the gradation portions 1d and 2d has a width of D/d. Accordingly, if an optical density D of each of the uniform density portions 1c and 2c is 0.9, a width of each of the gradation portions 1d and 2d is preferably 1.5 [mm] or more and 9.0 [mm] or less.

According to the present exemplary embodiment, therefore, the ND filter 1 is attached to the base plate 4 so as to be rotatable around the shaft 4b serving as a rotation shaft and movable between an in-use position and a retracted position. The ND filter 2 is attached to the base plate 4 so as to be rotatable around the shaft 4c serving as a rotation shaft and movable between an in-use position and a retracted position. The ND filter includes the uniform density portion 1c, the gradation portion 1d, and the transparent portion 1e, whereas the ND filter 2 includes the uniform density portion 2c, the gradation portion 2d, and the transparent portion 2e. If the ND filter 1 and 2 are in the retracted positions, the transparent portions 1e and 2e of the respective ND filters 1 and 2 overlap in an area facing the aperture 4a through which optical light passes, so that the entire area of the aperture 4a is covered with the transparent portions 1e and 2e. If the ND filters 1 and 2 are in the in-use positions, the gradation portions 1d and 2d of the respective ND filters 1 and 2 overlap in an area facing the aperture 4a through which optical light passes, so that the entire area of the aperture 4a is covered with the gradation portions 1d and 2d and the uniform density portions 1c and 2c. Moreover, a combined density acquired when the gradation portions 1d and 2d overlap with each other in just proportion is set to be substantially the same as an optical density of each of the uniform density portions 1c and 2c Therefore, size of the light amount adjusting device 10 can be reduced.

Moreover, in the present exemplary embodiment, a density change rate d of each of the gradation portion 1d of the ND filter 1 and the gradation portion 2d of the ND filter 2 is set in a range that satisfies Expression 5. Therefore, size of the light amount adjusting device 10 can be reduced, and influences on image quality can be reduced.

Next, a second exemplary embodiment of the present invention is described. The first exemplary embodiment has been described using an example in which the gradation portions 1d and 2d are set in consideration of errors in stop positions of the respective ND filters 1 and 2 at the time of use to reduce influences on a blurred image even if a stop position error occurs. However, in a case where an optical system with a depth of field that can disregard a blurred image is used, or an error in stop position of the ND filter at the time of use can be sufficiently reduced, the gradation portions 1d and 2d may not necessarily be set. Thus, ND filters 21 and 22 of the present exemplary embodiment are provided by excluding the gradation portions 1d and 2d from the respective ND filters 1 and 2 of the first exemplary embodiment. Therefore, components and configurations that are similar to the first exemplary embodiment will be given the same reference numerals as those described above with reference to FIGS. 1 through 8, and description thereof will be omitted.

Figure 9:
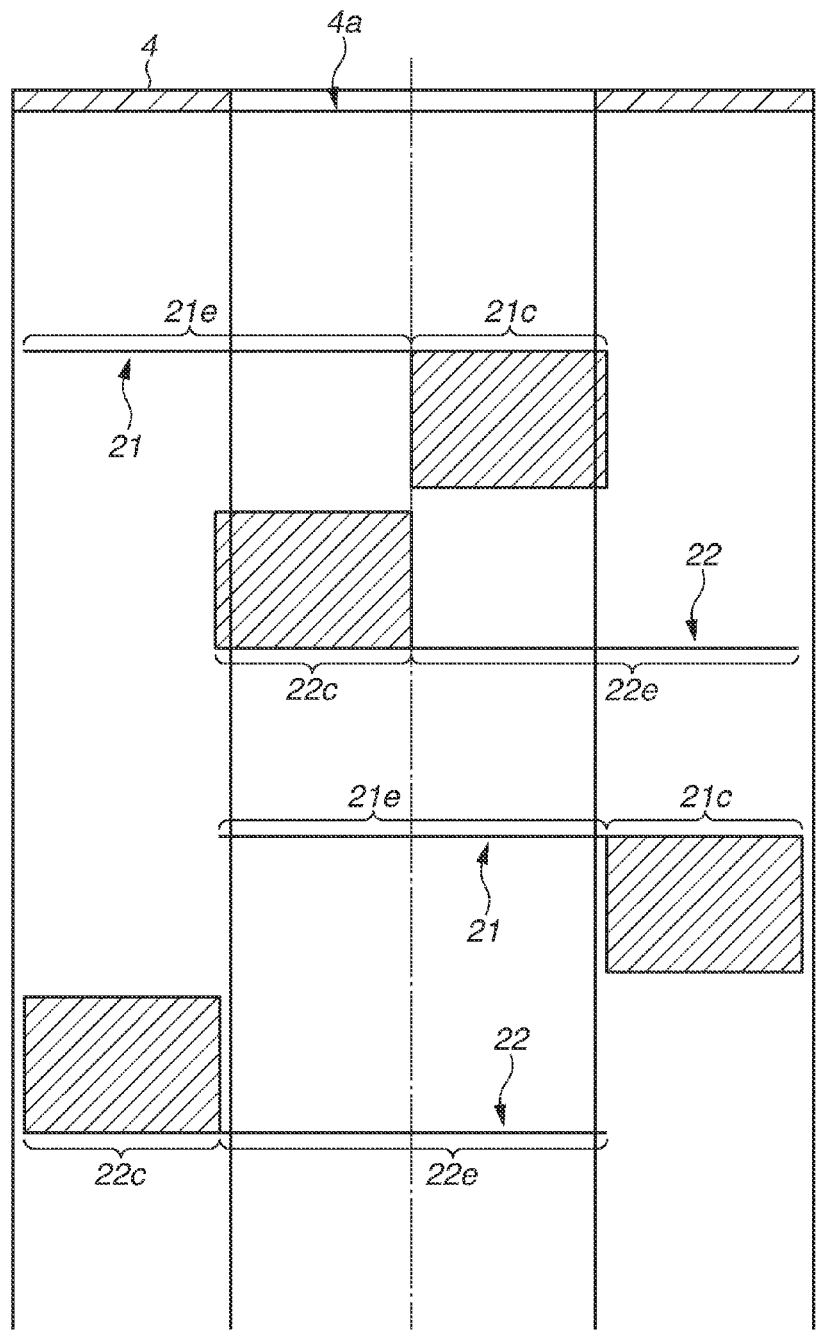
FIG. 9 is a diagram illustrating a fourth example of optical densities of the ND filters.

FIG. 9 is a diagram illustrating an optical density of each of the ND filters 21 and 22 when a driving pin 3b is in an ND in-use position and an ND retracted position. An upper portion of the diagram illustrated in FIG. 9 is the same as that of the diagram illustrated in FIG. 4. A middle portion of the diagram illustrated in FIG. 9 corresponds to that of the diagram illustrated in FIG. 4. A lower portion of the diagram illustrated in FIG. 9 corresponds to that of the diagram illustrated in FIG. 6.

That is, the middle portion of the diagram illustrated in FIG. 9 illustrates optical density distributions of the ND filters 21 and 22 with hatching when the driving pin 3b is in the ND in-use position. The lower portion of the diagram illustrated in FIG. 9 illustrates optical density distributions of the ND filters 21 and 22 with hatching when the driving pin 3b is in the ND retracted position. In FIG. 9, as similar to the diagram illustrated in FIG. 4, the greater the height of the hatching area, the higher the optical density of the ND filter 21. The greater the height of the hatching area, the higher the optical density of the ND filter 22.

Respective Shapes of the ND filters 21 and 22 are similar to those of the ND filters 1 and 2 of the first exemplary embodiment. As illustrated in FIG. 9, each of the ND filters 21 and 22 does not include a gradation portion. The ND filter 21 includes a uniform density portion. 21c serving as one example of a non-transparent area and a transparent portion 21e serving as one example of a transparent area, whereas the ND filter 22 includes a uniform density portion 22c and a transparent portion 22e. Each of the uniform density portions 21c and 22c has a width that can at least cover a half of an aperture 4a. In this case, size of an optical amount adjusting device can be minimized. Each of the transparent portions 21e and 22e has a width that can entirely cover the aperture 4a. As illustrated in FIG. 9, the ND filter 21 includes the uniform density portion 21c and the transparent portion 21e. For example, an area of the uniform density portion 1c and the gradation portion 1d illustrated in FIG. 2 corresponds to the uniform density portion 21c, whereas an area of the transparent portion 1e illustrated in FIG. 2 corresponds to the transparent portion 21e. Moreover, as illustrated in FIG. 9, the ND filter 22 includes the uniform density portion 22c and the transparent portion 22e. For example, an area of the uniform density portion. 2c and the gradation portion. 2d illustrated in FIG. 2 corresponds to the uniform density portion 22c, whereas an area of the transparent portion 2e illustrated in FIG. 2 corresponds to the transparent portion 22e.

Next, a third exemplary embodiment of the present invention is described. The first exemplary embodiment has been described using an example in which a density change rate d of each of the gradation portions 1d and 2d of the ND filters 1 and 2 is constant. The present exemplary embodiment is hereinafter described using an example in which a density change rate d of each of gradation portions of ND filters is not constant. Thus, a density change rate d of each of the gradation portions of the ND filters in the present exemplary embodiment differs from that in the first exemplary embodiment. Components and configurations that are similar to the first exemplary embodiment will be given the same reference numerals as those described above with reference to FIGS. 1 through 8, and description thereof will be omitted.

Figure 10:
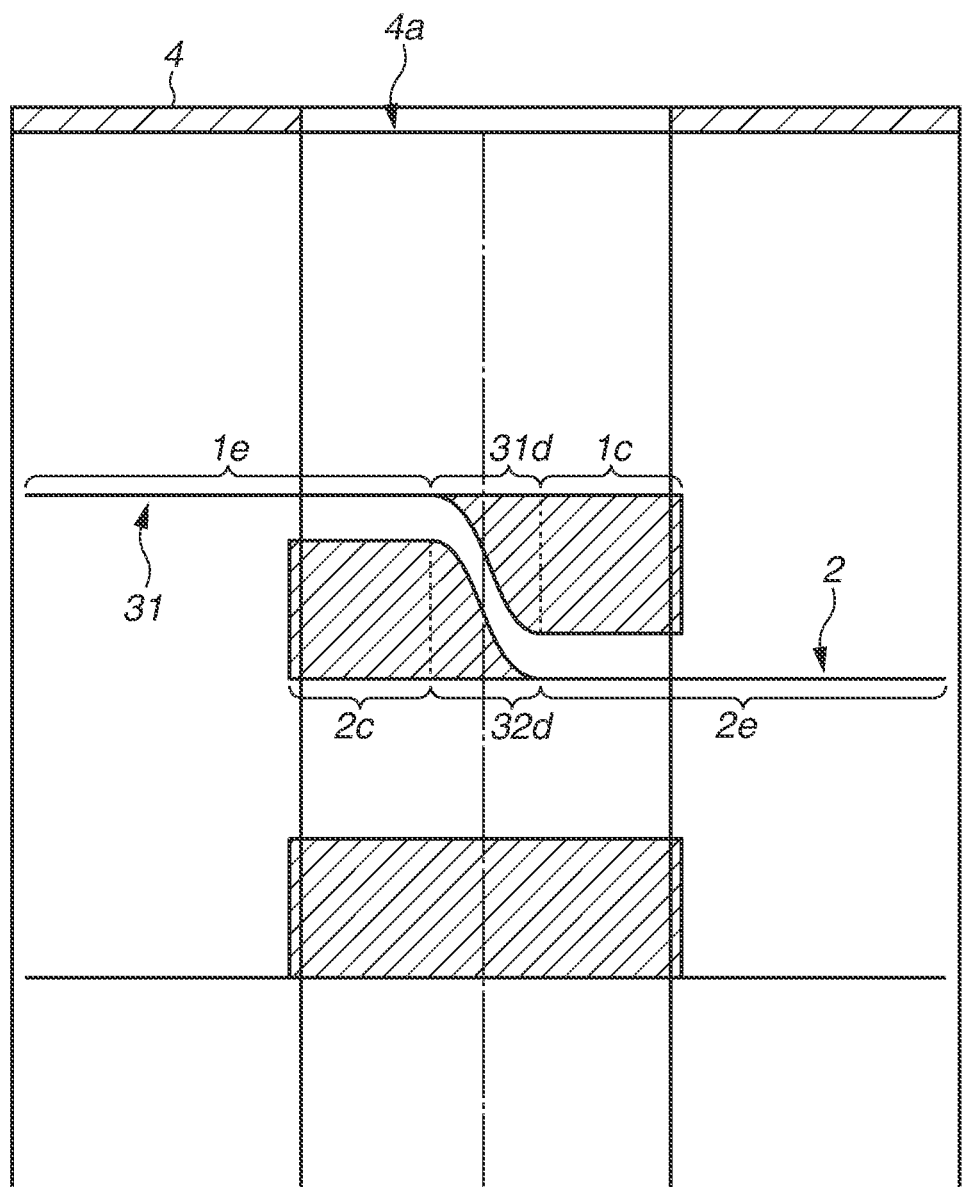
FIG. 10 is a diagram illustrating a fifth example of optical densities of the ND filters.

FIG. 10 is a diagram illustrating an optical density of each of ND filters 31 and 32 when a driving pin 3b is in an ND in-use position. Upper, middle, and lower portions of the diagram illustrated in FIG. 10 respectively correspond to the upper, middle, and lower portions of the diagram illustrated in FIG. 4. In the middle portion of the diagram illustrated in FIG. 10, optical density distributions of the ND filters 31 and 32 are separately illustrated with hatching. In the lower portion of the diagram illustrated in FIG. 10, a combined distribution of the optical density distributions of the ND filters 31 and illustrated in the middle portion of FIG. 10 is illustrated with hatching. In FIG. 10, as similar to the diagram illustrated in FIG. 4, the greater the height of the hatching area, the higher the optical density of the ND filter 31. The greater the height of the hatching area, the higher the optical density of the ND filter 32.

In FIG. 10, each of gradation portions 31d and 32d serves as one example of a gradation area, and has a linear optical density distribution (a density change rate d is constant). However, the optical density distribution of each of the gradation portions 31d and 32d is not necessarily be linear. For example, a density change rate d of the gradation portion 32d can be gently increased (risen) from a transparent portion 2e toward a uniform density portion 2c. In such a case, for example, a density change rate d of the gradation portion 31d can be gently decreased (set down) from a uniform density portion 1c toward a transparent portion 1e. The driving pin 3b is positioned in the ND in-use position such that a combined density of the ND filters 31 and 32 at the time of use is not only substantially uniform across the entire area facing an aperture 4a, but also substantially the same as an optical density of each of the uniform density portions 1c and 2c.

For example, the gradation portions 31d and 32d having such density change rates (the optical density distributions) can be set in the areas of the gradation portions 1d and 2d illustrated in FIG. 2, thereby providing the ND filters 31 and 32. However, the ND filters 31 and 32 may include other configurations. For example, the ND filter 31 can have a configuration that is substantially the same as that of the ND filter 1 of the first exemplary embodiment, and the filter 32 can have a configuration that is substantially the same as that of the ND filter 2 of the first exemplary embodiment.

The present invention has been described above with reference to the specific exemplary embodiments. However, the present invention is not limited to the technical concept of the embodiments described above. That is, various modifications are possible without departing from the technical concept or characteristics of the invention.

According to the present invention, a small-size light amount adjusting apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-044030, filed Mar. 5, 2015, which is hereby incorporated reference herein in its entirety.

What is claimed is:

1. A light amount adjusting device that adjusts an amount of light passing through an aperture, the light amount adjusting device comprising:
a first filter, including a transparent area and a non-transparent area, configured to move between a retracted position and an in-use position in an area including an area facing the aperture,
wherein a width of the non-transparent area is narrower than an opening diameter of the aperture; and
a second filter, including a transparent area and a non-transparent area, configured to move between a retracted position and an in-use position in an area including the area facing the aperture,
wherein, if the first filter and the second filter are in the retracted positions, the transparent area of the first filter and the transparent area of the second filter overlap in a position facing an entire area of the aperture,
wherein, if the first filter and the second filter are in the in-use positions, the transparent area of the first filter and the non-transparent area of the second filter overlap in a position facing the aperture, and the non-transparent area of the first filter and the transparent area of the second filter overlap in a position facing the aperture,
wherein the non-transparent area includes a uniform density area in which an optical density is substantially uniform, and a gradation area that is arranged between the transparent area and the uniform density area and includes an area in which an optical density continuously changes from the transparent area to the uniform density area, and
wherein, if the first filter and the second filter are in the in-use positions, the transparent area of the first filter and the uniform density area of the second filter overlap in a position facing the aperture, the uniform density area of the first filter and the transparent area of the second filter overlap in a position facing the aperture, and the gradation area of the first filter and the gradation area of the second filter overlap in a position facing the aperture.

2. The light amount adjusting device according to claim 1, wherein, if the first filter and the second filter are in the in-use positions, a value acquired by combining optical densities of the first filter and the second filter which overlap in the position facing the aperture is substantially uniform.

3. A lens barrel comprising the light amount adjusting device of claim 1.

4. An image capturing apparatus comprising:
the lens barrel of claim of 3; and
an image capturing element.

5. A light amount adjusting device that adjusts an amount of light passing through an aperture, the light amount adjusting device comprising:
a first filter, including a transparent area and a non-transparent area, configured to move between a retracted position and an in-use position in an area including an area facing the aperture;
a second filter, including a transparent area and a non-transparent area, configured to move between a retracted position and an in-use position in an area including the area facing the aperture,
wherein, if the first filter and the second filter are in the retracted positions, the transparent area of the first filter and the transparent area of the second filter overlap in a position facing an entire area of the aperture,
wherein, if the first filter and the second filter are in the in-use positions, the transparent area of the first filter and the non-transparent area of the second filter overlap in a position facing the aperture, and the non-transparent area of the first filter and the transparent area of the second filter overlap in a position facing the aperture;
wherein the non-transparent area includes a uniform density area in which an optical density is substantially uniform, and a gradation area that is arranged between the transparent area and the uniform density area and includes an area in which an optical density continuously changes from the transparent area to the uniform density area, and
wherein, if the first filter and the second filter are in the in-use positions, the transparent area of the first filter and the uniform density area of the second filter overlap in a position facing the aperture, the uniform density area of the first filter and the transparent area of the second filter overlap in a position facing the aperture, and the gradation area of the first filter and the gradation area of the second filter overlap in a position facing the aperture;
a base plate including the aperture;
a portion configured to define the in-use position of the first filter and the in-use position of the second filter; and
a portion configured to define the retracted position of the first filter and the retracted position of the second filter,
wherein the base plate includes:
a shaft to which the first filter is rotatably attached; and
a shaft to which the second filter is rotatably attached, and
wherein a relational expression of $0.1 < \delta \times \alpha 2 \times d < 0.6$ is established, where $\delta$ [mm] is a position error in the portion which defines the in-use position of the first filter and the in-use position of the second filter, $\alpha$ is a ratio of a distance between the shaft and the portion which defines the in-use position of the first filter and the in-use position of the second filter to a distance between the shaft and an optical axis center, and d is a density change rate [/mm] that is an amount of changes in optical density per 1 [mm] in the gradation area.

6. The light amount adjusting device according to claim 5, wherein a relational expression of $0.5/\alpha < d < 3/\alpha$ is established.

7. The light amount adjusting device according to claim 5, further comprising an actuator configured to rotate the first filter and the second filter,
wherein the base plate further includes a hole for rotation of the first filter and the second filter,
wherein the first filter further includes a hole that is arranged facing the hole formed in the base plate,
wherein the second filter further includes a hole that is arranged facing the hole formed in the base plate,
wherein the actuator includes a rod member to be inserted into the holes formed in the first filter, the second filter, and the base plate, and moves the rod member to rotate the first filter and the second filter, and
wherein the portion which defines the in-use position of the first filter and the in-use position of the second filter and the portion which defines the retracted position of the first filter and the retracted position of the second filter are a portion in which the rod member contacts the hole formed in the base plate.

* * * * *